Sept. 18, 1928.
C. B. WATERS
AUTOMOBILE CIRCULATION AND HEATING SYSTEM
Filed Nov. 20, 1926     5 Sheets-Sheet 1
1,684,900
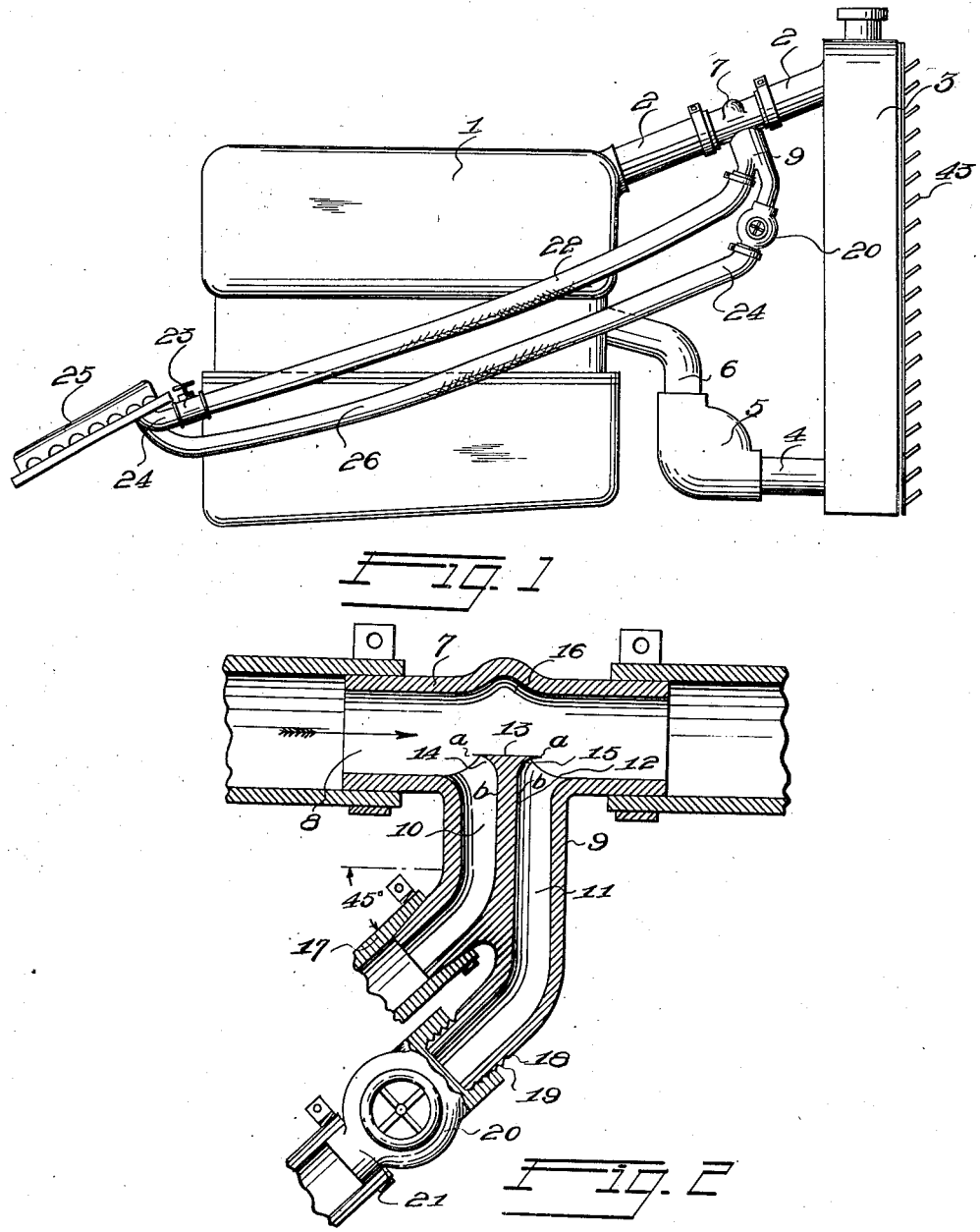
Inventor
Charles B. Waters
By William A. Strauch
Attorney Sept. 18, 1928.
C. B. WATERS
1,684,900
AUTOMOBILE CIRCULATION AND HEATING SYSTEM
Filed Nov. 20, 1926   5 Sheets-Sheet 2
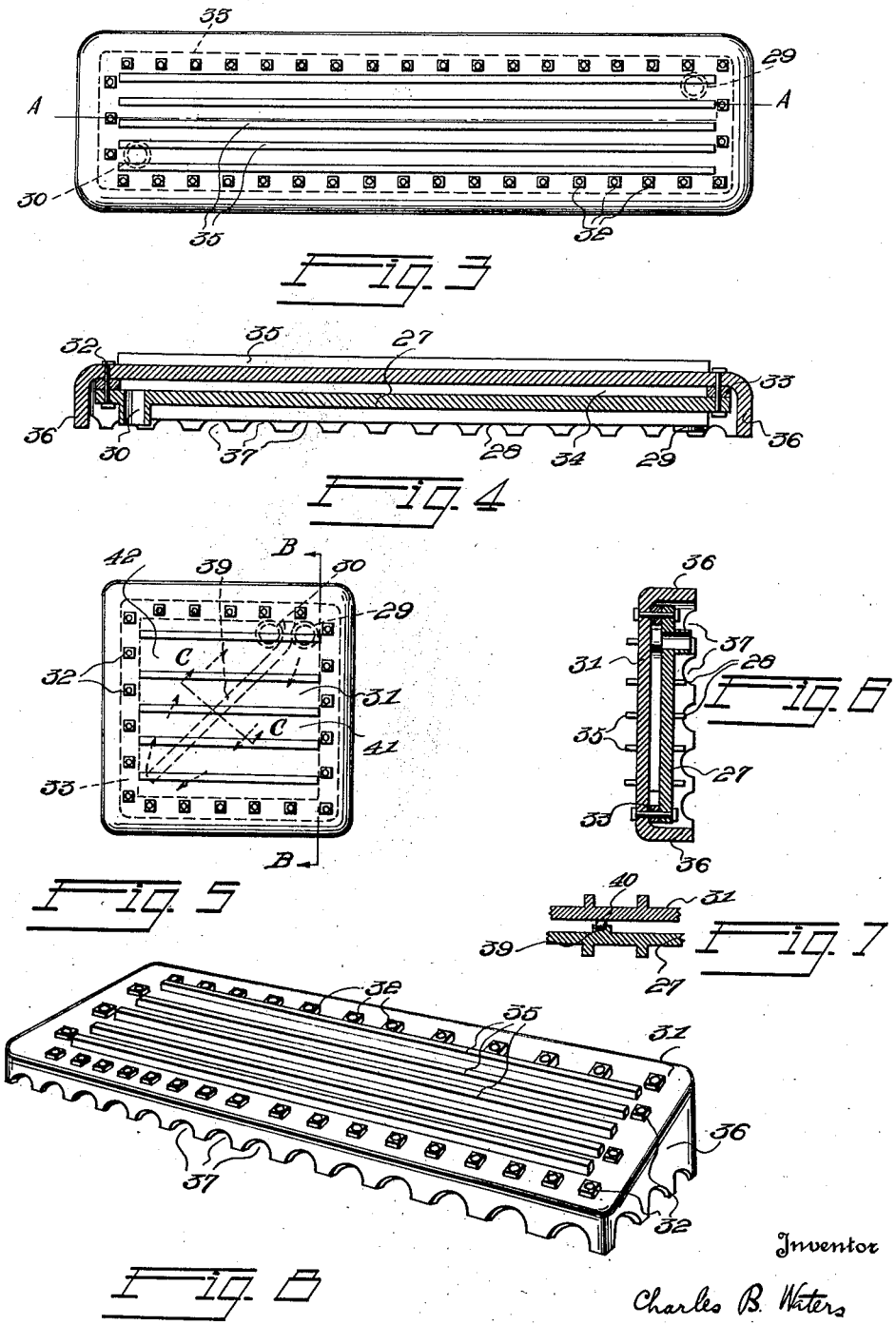

Sept. 18, 1928.

C. B. WATERS 1,684,900

AUTOMOBILE CIRCULATION AND HEATING SYSTEM

Filed Nov. 20, 1926      5 Sheets-Sheet 3

Inventor
Charles B. Waters
William A. Strauch
By
Attorney

Sept. 18, 1928.
C. B. WATERS
1,684,900
AUTOMOBILE CIRCULATION AND HEATING SYSTEM
Filed Nov. 20, 1926
5 Sheets-Sheet 5
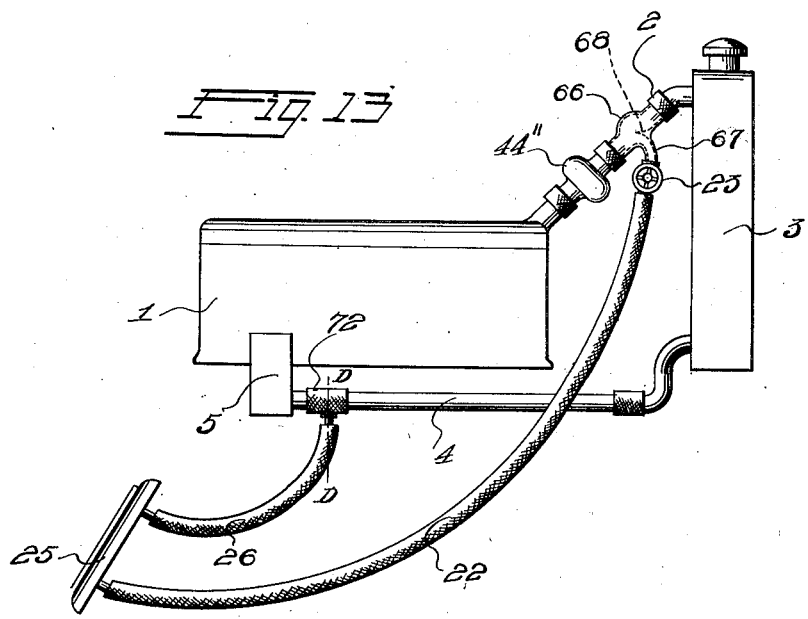
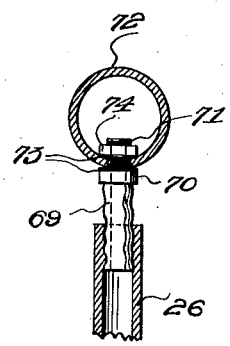
Inventor
Charles B. Waters
By William A. Strauch
Attorney Patented Sept. 18, 1928.

1,684,900

UNITED STATES PATENT OFFICE.

CHARLES B. WATERS, OF MONTCLAIR, NEW JERSEY.

AUTOMOBILE CIRCULATION AND HEATING SYSTEM.

Application filed November 20, 1926. Serial No. 149,726.

The present invention relates to motor vehicle circulation and heating systems and more particularly the invention comprises improvements in heating systems of the type shown in my Patent #1,575,667, issued March 9th, 1926, and in my copending application Serial No. 91,986, filed March 3, 1926.

In the practical application of the heating system shown in my above mentioned patent, I have discovered that the efficiency and effectiveness of the system may be considerably improved by properly proportioning the various areas, deflecting passages, and by specially proportioning and arranging the heater or radiating units, and at the same time the amount of water added to the circulating system for operation of the heater is reduced to a minimum.

An important improvement in the present invention over that shown in my above mentioned patent is effected by proportioning the arrangement of the deflecting and return openings in the coupling member between the heating and cooling system so that the distance between the outlet and return opening is reduced to a minimum. In this way the adverse head which must be overcome to maintain a circulation of hot water in the system is reduced and the rapidity of flow through the hot water heating system may be substantially increased. This increase of velocity of flow is important in its effect on the system as a whole, as it permits satisfactory heating with a reduced diversion of total flow in the cooling system.

A further decided improvement has been effected in the provision of a specially designed heater or radiating member in which a relatively small water space is provided in the heating units, which may be constructed of heavy masses of metal and provided with relatively large radiating surface areas in proportion to the volume of the water space, so that the heated water passes through the radiating members rapidly in a thin sheet and is robbed of its heat, and at the same time a minimum amount of water is deflected from the cooling system to effect the heating of the radiating members in satisfactory manner. By a proper design of the deflecting and radiating members, I have been able to reduce the total amount of deflection of water deflected from the cooling system to well below 20 percent of the total circulation in the average force feed cooling system, and have been able to secure efficient and satisfactory heating with a diversion of water ranging from 1 to 10 percent of the total circulation. Effective heating of the usual closed type of automobile may be maintained with a diversion of approximately 8 percent of the water in the circulating system. This diversion is so small that it has a negligible effect in the operation of the cooling system.

By my improvements I have been able to produce heating radiators that will function properly in which the volumetric capacity is as low as one pint of water or less, and the volumetric capacity of the hose couplings or conduits for an average automobile with two of my improved heaters is approximately one quart so that the increase in volumetric capacity of the water circulation system of an automobile will vary from approximately one to two quarts and will not exceed three quarts in any case of proper installation in pleasure cars. The relatively small increase in volumetric capacity of the water circulating system is an important feature of my invention, as the effect on the circulating system is negligible, while at the same time efficient heating is secured with a minimum diversion of water from the cooling system. Due to the small quantity of water utilized, the provision of heat insulated conduits or conduits of low heat conductivity between the diverter, the heating radiator is essential, otherwise a substantial proportion of the heat in the water will be lost before the water reaches the heater. The use of the heat insulating connections is accordingly an essential feature for efficient operation of my invention.

With my improved deflecting arrangement and heating or radiating members, I have been able to reduce the size of connections and the diversion of water to such an extent that in order to maintain a satisfactory heating in cold weather, a control of the water temperature becomes essential for satisfactory operation. In the prior proposed systems, the diversion of water and restriction of the cooling effect in the systems has been such as to give trouble due to overheating of the engine, but with my present improvements the diversion of water from the cooling system is so small that means for raising the temperature in the average force feed cooling system in cold weather by the provision of adjustable radiator covers or other suitable temperature controlling means must be provided. Preferably thermostatic control means operated by temperature variations of the water in the cooling system is interposed in the conduit or connection between the engine and the cooling radiator is provided. Thermostatically controlled shutters for the cooling radiator may be utilized to control the flow of water to the cooling radiator and the heating radiator.

My invention with a thermostatically controlled valve interposed between the engine and the cooling radiator, may be of two general forms. In one form the valve is disposed between the coupling member or diverter system for the heating, and in the other form the thermostatic valve is interposed between the diverter and cooling radiator. In each of these forms the novel result of simultaneously maintaining the water in the engine jacket and in the heating systems at a temperature that is conductive to the most efficient operation of the engine, and at the same time to efficient operation of the heating system. The most desirable temperature to which the water is controlled is approximately 160° Fahrenheit. In each of these forms, circulation of water through the heating system is caused immediately upon the starting of the engine even though the flow to the cooling radiator is restricted. The temperature of the engine and of the water circulating through the heating system accordingly rises rapidly when starting cold. When the water temperature reaches the desired value, the thermostatic valve opens permitting flow of water to the cooling radiator through the diverter coupling maintaining a flow of water through the heating system sufficient for the proper and effective heating operation thereof. The restriction of flow of water to the cooling radiator in this form of invention, in cold weather results in a tendency for freezing of the water in the cooling radiator. A suitable percentage of anti-freezing liquid must be maintained in the circulating system of the engine to prevent freezing. In the form of my invention in which the valve is disposed between the diverter coupling and the engine, the hot water passing through the heater is by-passed around the thermostatically controlled valve and is discharged into the cooling radiator tending to raise the temperature of the water in the cooling radiator and to prevent freezing thereof. In the form of invention where the thermostat is interposed between the diverter coupling and the cooling radiator the water circulating through the heating system is discharged to the suction side of the pump, and properly inclining the connection between the cooling radiator and circulating pump, a tendency will exist for the hot water to rise into the cooling radiator aiding in raising the temperature of the water in the cooling radiator and preventing freezing thereof.

Accordingly, objects of the present invention are to provide an improved water heating system for automobiles and the like, in which the diversion of water from, and addition of water to the cooling system is negligible while at the same time a high heating efficiency is maintained; to provide novel means for regulating the temperature of water in the cooling system to maintain a high operating efficiency of the engine and at the same time to provide satisfactory heating; and to provide novel water temperature and level indicating means.

It is a further object of my invention to provide a thermostatically operated valve in the water circulatory cooling system of an internal combustion engine so positioned that the valve with respect to the outlet and inlet branches of my improved heating system set forth in the patent and application above referred to, that there is a direct and positive circulation through said heater when the car has just been started, at which time the temperature of the body of the car is ordinarily at its lowest point.

Another object of the invention is to provide a water heating system in combination with the circulatory system of an automobile in which the heating radiators are rapidly heated when the engine is started, independently of the circulation of water in the cooling system, and in which after the water is heated the flow of water in the cooling system is utilized to maintain the flow of hot water through the heating radiators.

Further objects of the invention are such as may be attained by the various combinations, sub-combinations, and principles more fully hereinafter set forth and as defined by the scope of the appended claims.

Referring to the drawings—

Figure 1 is a diagrammatic side elevation showing the general arrangement of one form of the invention.

Figure 2 is a sectional view showing the arrangement of an improved coupling member whereby the efficiency of operation of my improved systems is substantially improved.

Figure 3 is a plan view of a form of heater especially adapted for use in the invention.

Figure 4 is a sectional view taken along line A—A of Figure 3.

Figure 5 is a plan view of a modified form of heater especially adapted for use with my invention.

Figure 6 is a sectional view taken along line B—B of Figure 5.

Figure 7 is a fragmental sectional view along line C—C of Figure 5.

Figure 8 is a perspective view showing a modified form of heater arrangement and combined foot rest especially adapted for use with the system of my invention.

Figure 13 is a diagrammatic side elevation of another form of invention.

Figure 14 is a detailed sectional view taken along line D—D of Figure 13.

Figure 9:
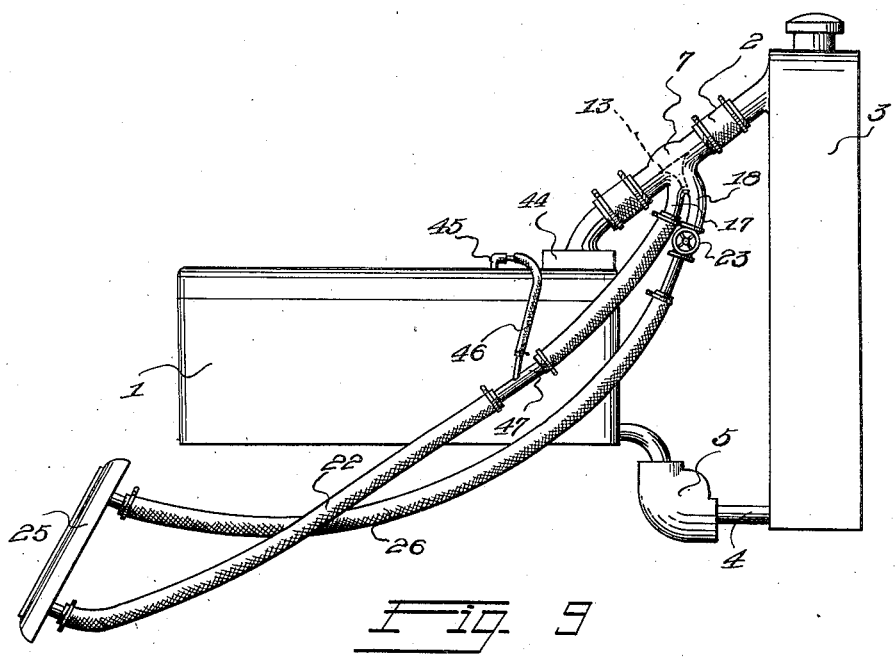
Figure 9 is a diagrammatic illustration of a preferred embodiment of my invention in which a thermostatic control is utilized.

As shown in Figure 1, 1 represents the engine of a motor vehicle, the upper part of the jacket space of which is connected by means of the conduits or hose couplings 2 to the upper part of a cooling radiator 3. Cooling radiator 3 is connected in well known manner to atmosphere, and at its bottom is connected by means of coupling 4 to a water circulating pump 5. Pump 5 is driven in any suitable manner from the engine and is connected by means of the coupling 6 to the lower part of the cooling jacket for the engine 1. As is well known in the art, cooling water from radiator 3 is drawn through coupling 4 by the pump 5 and forced through coupling 6 into the engine cooling jacket and through return coupling back to cooling radiator. Interposed in the connection 2 between the engine 1 and the radiator 3 is a coupling member 7 made of suitable metal and provided with a main opening or passage 8 of such an area that the main circulation cooling system is not substantially restricted.

Formed in a branch 9 of the coupling member 7 is an outlet passage 10 and a return passage 11 for water deflected from the cooling system. A common wall 12 separates the passages 10 and 11 from each other and terminates in a projecting section 13 which protrudes into the main passage 8 to deflect a portion of the water flowing through the passage 8 in the direction shown by the arrow (Figure 2). The projecting section 13 is curved at 14 and 15 in the shape of a parabola starting at "$a$" in a line parallel to the direction of flow of the water through the passage 8 and terminating at "$b$" in the surfaces of wall 12. The relation of the sectional areas of the passages 10 and 11 to each other and to the sectional area of the passage 8 is an important feature of the present invention. While cross-sectional areas of the passages 10 and 11 are preferably equal to each other and may range from approximately 1 to 25 percent of the cross-sectional area of the passage 8, I have found that for most satisfactory operation the sectional areas of the passages 10 and 11 should be below 10 percent and above 1 percent of the cross-sectional area of the passage 8. An excellent proportion in practice has been reached when the areas of the passages 10 and 11, respectively, are equal to about 2 percent of the area of the passage 8.

The amount of protrusion and shape of the projecting sections 13 of the wall 12 are such that the area of opening at the mouths of the passages 10 and 11 communicating with the passage 8 is equal to or preferably slightly greater than the cross-sectional area of the passages 10 and 11 and the openings at the mouths are as close to each other as is possible.

To reduce the restriction of flow of water through the passage 8 by the projecting member 13 the area of the passage 8 is enlarged at 16 by providing an outward bulge in coupling 7 around the projection 13 so shaped as to maintain the area of the passage 8 substantially uniform throughout the length of the coupling member 7.

Passage 10 extends downward through the arm 9 and through a coupling projection 17, while the passage 11 is extended through a coupling projection 18 which protrudes beyond the end of the coupling projection 17 and is provided with a threaded section 19 upon which a control valve 20 is threaded. The control valve 20 may be of any usual type for stopping the flow of water through the passage 11 and is provided with a coupling section 21. The coupling sections 17 and 18 are inclined at an angle of approximately 45 degrees to the branch 9. This is an important feature of the invention as it permits the application of my improved system to any of the present well known automobile cooling systems regardless of variation of the angle of couplings 2 without introducing reverse bends into the flexible hose couplings.

Secured to the coupling projection 17 is a flexible hose connection 22 which at its lower end is connected to a heater control valve 23. Valve 23 is connected by means of a suitable connection 24 to the inlet opening of one of my specially constructed water heaters 25. The outlet opening of the heater 25 is connected by means of a flexible hose connection 26 to the coupling section 21 of the valve 20. The hose connections 22 and 26 are of flexible material which acts as a heat insulator preventing loss of heat from the water passing there through.

The proportions and construction of the heaters or radiating units used are of a type especially adapted for use in connection with my improved heating system. The heater arrangements are such as to provide a water space in the heater through which the water must pass in a wide sheet or stream which is as thin as practicable in commercial constructions. By this arrangement, a large amount of radiating surface is secured with a small volume of water space in which the water changes rapidly.

In the form of heater shown in Figures 3 and 4, a bottom casting 27 is provided on the lower surface thereof with a plurality of ribs 28 to increase the radiating surface and to strengthen the casting. Inlet connection 29 and outlet connection 30 for the water are provided. Casting 27 is secured to top casting 31 by means of the bolts 32 which pass through and secure a spacing gasket 33 in position to form the walls of a water space 34 between the plates 27 and 31. Gasket 33 is of sufficient thickness and of such shape as to give the desired cross-sectional area of the water space 34. Bolts 32 are of such a size and strength that in event the water in the heater freezes they will fracture due to the expansion of the ice before the castings 27 or 31 will break. To provide additional radiating surface and for strengthening top of the casting 31 the ribs 35 are provided on the upper surface thereof. Side members 36 are formed integrally with the tip casting 31. Formed on the bottom edges of side members 36 are the openings or notches 37 for the admission of air to the bottom casting 27 of the heating unit when the heater is in position on the floor or foot board of an automobile. The sides 36 provide supports for the heater and at the same time improve the appearance thereof by covering the bottom plate and the spacing gasket construction. It will be noted in this form of heater the water will be forced through space 34 from the inlet opening 29 to the outlet opening 30 in a sheet or stream which may be one-quarter inch or less in depth and from which the heat will be transferred rapidly. A small amount of continuously changing hot water is continuously forced through the heater which will accordingly warm up rapidly. Because of the mass of metal utilized, the heat will be retained for a substantial period of time after the flow of hot water has ceased so that the car will be heated after the engine has been stopped for a substantial period of time.

The form of heater shown in Figures 3 and 4 is especially adapted for location between the seats of a car to be used. When it is desired to place the heater on the inclined foot-board of an automobile to heat the front of the machine, the form of heater shown in Figures 5, 6 and 7 is preferably utilized. In this form of heater the lower and upper castings 27 and 31 are substantially square in shape and a rib or dividing member 39 is formed integrally with and diagonally across the upper surface of the casting 27. The rib 39 is centrally grooved and nesting in the groove is a compressible packing member 40 preferably of a strip of rubber circular in cross-section, against which the lower surface of the upper casting 31 is pressed by means of the bolts 32 when the unit is assembled. The rib 39 and strip 40 divide water space 34 into sections 41 and 42. In this form of the invention the inlet connection 29 for the heated water is formed at the upper right hand corner of the section 41 adjacent the partition 39, and the outlet 30 for the water is formed on the opposite side of the partition 39 in section 42 adjacent the inlet 29 and outlet 30 at the right hand side of the inclined foot-board of an automobile in a position clearing the exhaust pipe of the engine as ordinarily disposed. Heated water passing inward through the connection 29 is compelled to circulate in a long path as indicated by arrows in Figure 5 through section 41, around the end of the partition 39, and through section 42 to the outlet opening 30.

In the form of heater shown in Figure 8, the side member 36 for the elongated heating unit as shown in Figures 3 and 4 is shaped so that when the heater rests on the floor of a machine or automobile, top casting 31 will be inclined and will serve as a foot rest heater.

It will be understood that any one of the forms of heaters described may be used at 25 in Figure 1. To provide for a suitable control of the temperature of water in the cooling system, a radiator cover 43 of any well known type is provided which may be adjusted to provide a suitable water temperature in the cooling system for effective heating as weather conditions vary.

In operation of the form of invention so far described, the heated water from the engine is circulated through the passage 8 of the coupling member 7. As the water passes projecting section 13, the velocity of flow will build up a circulating pressure in the passage 10 and will exert a suction on the mouth of passage 11. The combined pressure and suction action will be ample to force the heated water at a relatively rapid rate downward through passage 10 and hose connection 22 to the heating unit 25 and back through the hose connection 26, passage 11 into the circulating system, against the natural tendency for the heated water to rise and against the difference in head of the column of water in passages 10 and 11 and connections 22 and 26. In the heater 25 the water will be robbed of its heat and the heat will be radiated into the space to be heated.

Instead of utilizing radiator cover 43, a thermostatic control valve disposed between engine 1 and cooling radiator 3 may be provided. In this form of invention, as shown in Figure 9, a thermostatically controlled valve 44 of any well known type controlling the flow of water through conduit 2 is disposed adjacent the engine jacket. Threaded into the engine jacket as close to the valve 44 as possible, is a special L pipe fitting 45 that is connected by a flexible hose coupling 46 of heat insulating material to a special T pipe fitting 47 that is connected in the hose 22 as shown. It is found in practice that the L fitting 45 and the branch of T fitting 47 connected to hose 46 may be one-eighth inch pipe size, while the section of the T fitting 47 disposed in the hose connection 22 may be a three-eighth inch pipe size, these sizes giving excellent proportions in the usual types of automobiles.

Thermostatic valve 44 is designed so that it remains closed, shutting off the flow of water through conduit 2 until the temperature of the water reaches approximately 160 degrees Fahrenheit. When the temperature of the water reaches this point the valve opens permitting the water to circulate freely through the cooling system. When the car to which the heating system is applied has been standing for some time in cold weather, the temperature of the water in the cooling system, and of the body of the car will be low. Accordingly, valve 44 will be closed when the engine is started and will remain closed until the water adjacent the valve in the engine jacket reaches a temperature of approximately 160 degrees Fahrenheit at which temperature the engine will operate at high efficiency. Before this condition occurs the water cannot circulate in the cooling system and the pump 5 will build up a positive pressure in the engine jacket which will cause a flow of heat through connection 45, hose 46, coupling 47, heater 25, and hose 22 around valve 44 to cooling radiator 3. It will accordingly be seen that before the engine is well heated a substantial quantity of water will be forced through heating radiator 25 at the time when the temperature of the car is at its lowest. Such forced circulation through the radiator will continue until the engine is well heated at which time the temperature of the heater 25 will be raised substantially. The valve 44 then opens initiating the normal flow of the water in its function of cooling the engine. At this time the heater 25 and car having been heated, only a small percentage of the hot water need flow through the radiator to maintain the desired temperature and in view of the fact that the valve 44 is opened the pressure in the engine jacket is reduced and substantially no flow of water will occur through connection 45. The flow through heater 25 will then be maintained by the effect of velocity of flow of water in the cooling system in diverter 7. Because of the reduced pressure tending to circulate water through heater 25 when valve 44 is opened less water may be circulated through the heater than when valve 44 is closed and the temperature of the water is low, the relative amounts of water circulated through the heater depending upon the relative pressures with valve 44 open and closed and upon the relative passage areas. In this form of invention it will be noted the water by-passed around valve 44 with the valve closed is discharged into the cooling radiator and tends to raise the temperature of water in the cooling radiator, thus tending to prevent freezing in the cooling radiator in cold weather. It will also be noted that by closing the valve 23, hot water is cut off from the heater 25 as no water can be forced through it whether valve 44 is open or closed.

Figure 10:
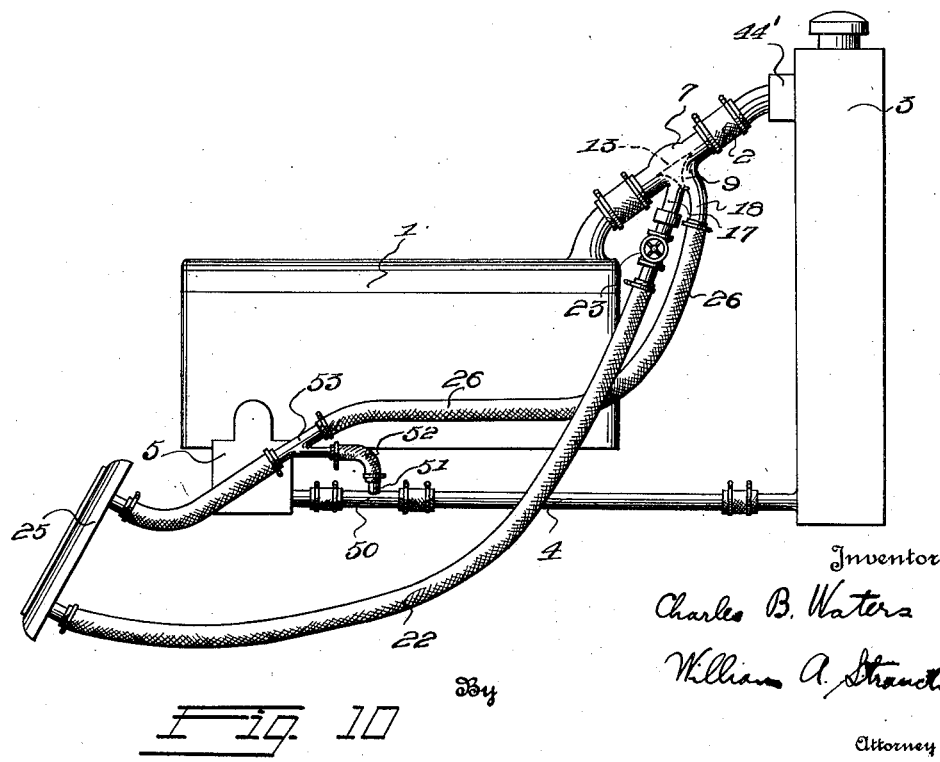
Figure 10 is a diagrammatic illustration of the arrangement of parts for a modified form of invention utilizing a thermostatic control valve.

In the form of invention shown in Figure 10, a thermostatic valve 44' is connected in conduit 2 between diverter 7 and cooling radiator 3 as indicated, the valve 23 is connected between inlet leg 17 of diverter 7 and to the end of heater feed hose coupling 22. The suction side of the pump 5 is connected by a conduit 4 to the cooling radiator 3 and connected in conduit 4 is the main branch of a special R pipe fitting 50. Pipe fitting 50 is provided with a reduced outlet 51, preferably a one-eighth pipe size that is connected by the flexible hose coupling 52 of heat insulating material to a one-eighth inch pipe size branch of special T fitting 53, the other branch of which is connected in heater outlet hose coupling 26 from the heater to the suction leg 18 of the diverter.

In this form of invention, the thermostatic valve 44' also remains closed preventing circulation of the water until the proper temperature of the water is reached and preferably until the water in the engine jacket reaches approximately 160 degrees Fahrenheit. With valve 44' closed, no circulation of water through the diverter 7 can occur. Pressure will be built up by the action of pump 5 in diverter 7 and as the discharge hose 26 of the heater 25 is connected to the suction side of the pump 5 through fittings 50 and 53 and hose coupling 52, heated water will circulate through leg 17 of the diverter, hose coupling 22, and heater 25 to the suction side of the pump through shunt coupling 52 as the engine is started, immediately causing radiating member 25 to heat up. When the temperature of the water causes the opening of the thermostatically controlled valve 44', the water will circulate through the cooling system and diverter 7 will function as above set forth to maintain a circulation of heated water through the radiating member. By inclining conduit 4 upward from pump 5 to the motor a tendency for the hot water discharged from the heater to rise to cooling radiator 3 will exist, tending to prevent freezing of the water in radiator 3. By closing valve 23 the heating system is cut off.

Figure 11:
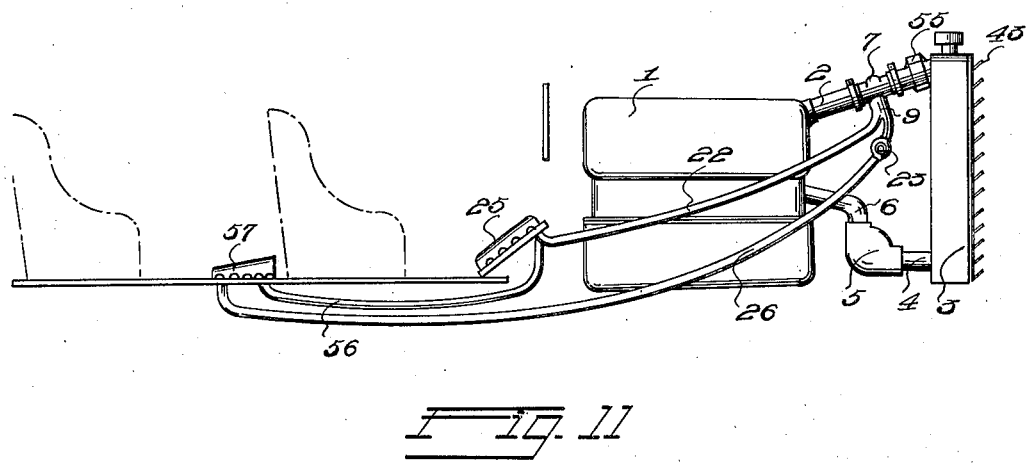
Figure 11 is a side elevation diagrammatic in nature showing a further modified arrangement of the invention with a thermostatic control.

Instead of relying on the operator to adjust the radiator cover or temperature regulating member 43, a thermostatic control therefore may be provided. In this case, as shown in Figure 11 a suitable operating mechanism for the cover 43, such for example as a thermostatic control 55 of any well known type may be provided to regulate the temperature of the water in the circulating system, and to maintain the same at a suitable temperature for heating without permitting dangerous temperatures to develop in the engine.

In the forms of my invention, the outlet opening of the heater 25 may be connected by a flexible hose connection 56 to the inlet of a second heater 57. In this event the return coupling 26 is connected to the outlet or discharge opening of the heater 57. In this form of invention the heated water is forced through heaters 25 and 57 in series and then is returned through the flexible hose coupling 26 to the cooling system.

Figure 12:
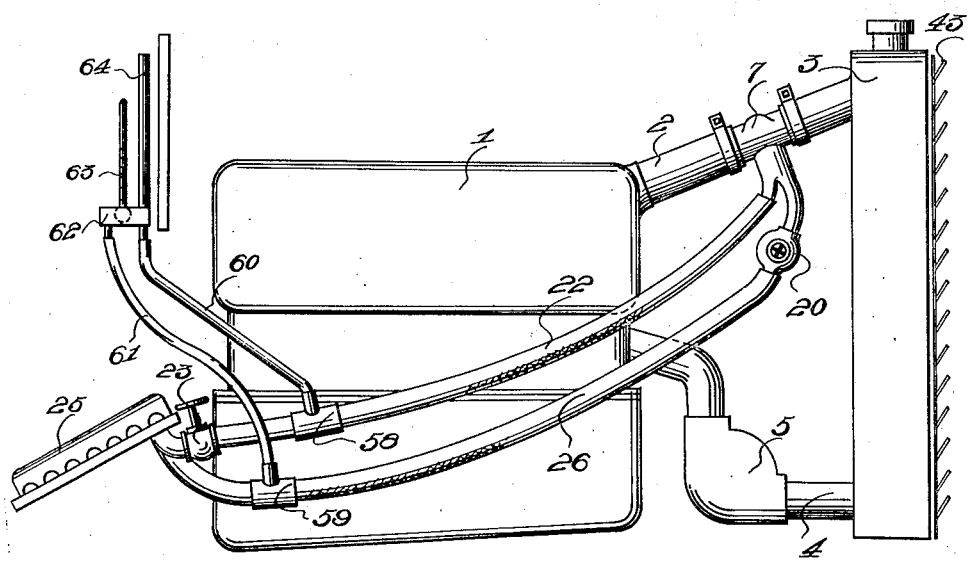
Figure 12 is a diagrammatic side elevation showing a still further modification of the invention.

In the form of invention shown in Figure 12, means to indicate the water level and temperature in the circulating system are provided. Branch connection 58 and 59 are provided in the flexible hose connections 22 and 26 from which the flexible hose connections 60 and 61 are led to a small water chamber 62 which may be supported from the dash of an automobile. Sealed into the chamber 62 and extending therefrom is a thermometer 63 upon which the temperature of the water in the chamber 62 is indicated to the operator. A water column 64 communicating at its lower end with chamber 62 and at its upper end with atmosphere is provided.

In operation of this form of invention, the operation of the heating system is the same as set forth for Figure 1. Water from the heating system will, however, pass upward through the connections 60 and 61, flowing through the chamber 62 and indicating the approximate temperature and level of the water in the cooling system on thermometer 63 and column 64. By closing the valve 23, circulation of the water through the heater 25 is cut off without interferring with the flow of the water through the conduits 60 and 61 to the chamber 62, so that whether the heater is in operation or not, an indication of the temperature and level of the water in the cooling system may be obtained at the dash of the machine.

In Figures 13 and 14, a simplified form of thermostatically controlled and engine circulating system is disclosed. In this form of invention a special diverter coupling 66 is interposed in the conduit 2 between the thermostatic control valve 44" and the cooling radiator 3. Thermostatic control valve 44" is constructed so that it cannot completely shut off the flow of hot water through conduit 2, and when closed a small flow of hot water is permitted. This flow may be provided for satisfactorily in the usual type of thermostatic valve used in automobile circulating systems by drilling a three-sixteenth inch hole through the valve disc, or a valve may be constructed that will not completely close, leaving an area approximately equal to the area of a three-sixteenth hole for the passage of water therethrough when closed. The diverter 66 is provided with a single outlet connection or leg 67 of three-eighth inch pipe size or less, over which extends the diverting lip 68. It will be understood, however, that lip 68 may be omitted if desired. Connected to the outlet leg 67 is the control valve 23 to which flexible heater feed hose coupling 22 is connected. Discharge hose 26 of the heater 25 is connected to a special coupling member 69 provided with a three-eighth inch or smaller pipe size central passage. Member 69 has a shoulder projection 70 and a threaded extension 71. Extension 71 passes through a suitable hole in hose section 72, and is secured in position by means of the washers 73 and the securing nut 74. Hose section 72 is connected in conduit 4 between the cooling radiator 3 and the circulating pump 5.

In this form of the invention it is especially important that the amount of water diverted to the heating system be small in comparison to the amount of water flowing in the circulating system, and also that the quantity of water in the heating system be small to effect a proper functioning of the heating system. A diversion of less than 10 percent of the flow from the cooling system and a volumetric capacity of approximately two quarts of water or less in the heating system with my improved heaters having a volumetric capacity of approximately one pint give excellent results. It is also of primary importance that thorough heat insulation be provided in the hose connection 26 which is preferably a rubber composition of low heat conductivity, because of the relatively small volumetric capacity of the heating system.

In operation of the device, when the engine is started cold, pump 5 forces the minimum flow of water from the jacket of the engine 1 through the opening of the thermostatic valve 44" and into the diverter 66 and the water heats rapidly. As heater discharge conduit 26 is connected to the suction side of the pump a circulation of the heated water that passes through the thermostatic valve is established through the heater 25. As the temperature of the water in the engine jacket rises above 160 degrees Fahrenheit, thermostatic valve 44" will open permitting the water to circulate freely through the conduit 2 and a circulation of sufficient water to maintain proper heating but insufficient to interfere with the proper cooling of the engine is maintained through the diverter 66, hose 22, heater 25, and hose 26 to the suction side of the pump 5. By permitting more water to flow through the conduit 2 with the thermostatic valve 44" closed than is circulated through the heating system, some of the hot water will pass continuously into the cooling radiator preventing freezing of the cooling radiator before the water temperature is high enough to cause opening of the valve 44". Because of the efficient nature of my improved heating radiators and the small quantity of water upon which they operate, and because of the relatively small quantity of diversion of water required from the cooling system, valve 44″ may be eliminated and an effective heating system for automobiles without the thermostatic control valve will be provided. I am aware that it has been heretofore proposed to divert water for a heating system from a point between the engine jacket and the cooling radiator through a heater to the suction side of the circulating pump in automobiles, but such proposed systems have been unsuccessful because of the failure to provide heat radiating members that function satisfactorily on a small quantity of water and to insulate against heat loss in the connecting pipes and conduits. Efforts have been made to compensate for the heat loss in such prior arrangements by utilizing metallic feed pipe connections to the heater that are coiled around the engine exhaust pipe, but such efforts have failed. I have found that for this type of system the novel combination and proportions of elements heretofore disclosed are essential for satisfactory operation.

It will be understood that preferred embodiments only of the invention have been disclosed and that many variations may be made by those skilled in the art without departing from the principles herein set forth. Accordingly, what is desired to be secured by Letters Patent and claimed as new is:

1. In combination with a water cooling system for an automobile; a hot water heating system comprising means for diverting less than 20 percent of the water from said cooling system under circulating pressure built up by the velocity of the flow of water in said cooling system; a radiating member disposed below said diverting means through which the diverted water is passed in a thin wide sheet; a feed conduit connecting said diverting means with said radiating member; and a conduit connecting said radiating member and a point in said system above said member and adjacent said diverting means for returning the diverted portion of the water to the cooling system.

2. In combination with a water cooling system for an automobile; a hot water heating system comprising means for diverting from 1 to 20 percent of the water from said cooling system under circulating pressure built up by the velocity of the flow of water in said cooling system; a radiating member disposed below said diverting means through which the diverted water is passed in a thin wide sheet; a feed conduit connecting said diverting means with said radiating member; and a conduit connecting said radiating member and a point in said system above said member and adjacent said diverting means for returning the diverted portion of the water to the cooling system.

3. In combination with a water cooling system for an automobile, a hot water heating system comprising means for diverting approximately 8 percent of the water from said cooling system under circulating pressure built up by the velocity of the flow of water in said cooling system; a radiating member disposed below said diverting means through which the diverted water is passed in a thin wide sheet; a feed conduit connecting said diverting means with said radiating member; and a conduit connecting said radiating member and a point in said system above said member adjacent said diverting means for returning the diverted portion of the water to the cooling system.

4. An automobile heating system utilizing the water of the engine cooling system of the automobile comprising a heat radiator of restricted capacity compared to the capacity of the engine cooling system disposed wholly within the automobile body and formed to provide a water circulating chamber shaped to cause said water to flow therethrough in a thin sheet-like stream, and to radiate heat therefrom in all directions, means to conduct water from said engine cooling system to said heat radiator within the body, and means to return the water from said heat radiator to said cooling system, said conducting and returning means being of small capacity and connected to said engine cooling system so that only a relatively small portion of the water circulating in that system is caused to flow through said heat radiator.

5. An automobile heating system utilizing the water of the engine cooling system of the automobile comprising a heat radiator of restricted capacity compared to the capacity of the engine cooling system and having large radiating surfaces disposed wholly within the automobile body to freely radiate heat from said surfaces in all directions within said body, means to conduct water from said engine cooling system to said heat radiator within the body, and means to return the water from said heat radiator to said cooling system, said conducting and returning means being of small capacity and so connected to said cooling system that not more than twenty per cent of the water circulating in that system is caused to flow through said heat radiator, whereby the operation of the cooling system is not substantially affected.

6. An automobile heating system utilizing the water of the engine cooling system of the automobile comprising a heat radiator of restricted capacity compared to the capacity of the engine cooling system and having large radiating surfaces disposed wholly within the automobile body to radiate heat from said surfaces in all directions, and formed on its interior to provide a water circulating chamber shaped to cause the water to flow therethrough in a thin sheet-like stream, means to conduct water from said engine cooling system to said heat radiator within the body, and means to return the water from said heat radiator to said cooling system, said conducting and returning means being of small capacity and connected to said engine cooling system so that only a relatively small portion of the water circulating in that system is caused to flow through said heat radiator, whereby the cooling and heating systems may operate concurrently.

In testimony whereof I affix my signature.

CHARLES B. WATERS.